UNITED STATES PATENT OFFICE.

LUCIUS E. CHITTENDEN, OF WASHINGTON, DISTRICT OF COLUMBIA.

IMPROVED MATERIAL FOR THE MANUFACTURE OF BUTTONS, HANDLES FOR KNIVES, AND FOR OTHER PURPOSES.

Specification forming part of Letters Patent No. 45,977, dated January 24, 1865.

*To all whom it may concern:*

Be it known that I, LUCIUS E. CHITTENDEN, of the city of Washington, in the District of Columbia, have invented a new and original manufacture and material for the manufacture of buttons, handles for pocket, table, and other cutlery, inlaying for furniture, and all such other articles of ornament or use as have heretofore been made, in whole or in part, from the material called "mother-of-pearl," or the external covering of marine reptiles and marine molluscous animals, of which the following is a specification.

The nature of my invention consists in the use of the nacre, or the interior portion of the shells of the various species of animals found in the fresh-water streams, lakes, and ponds of North and South America, which are popularly known as "fresh-water clams or muscles," and are described in scientific works as belonging to the genus *unio* or the genus *anodonta*. This nacre is deposited during the growth of the animal in successive layers. In many species the layers are uniform in color, in others of different colors. In most of the species it is either transparent or translucent, and is susceptible of a high polish. The removal of the exterior or coarser portions of the shell leaves the nacreous portion of it fit for use. The exterior refuse may be removed either before or during the process of manufacture. This material may be made into a great variety of useful or ornamental articles by any of the known processes of turning or manufacturing ivory, shells, horn, bone, metal, or wood. Among these articles may be named buttons of all kinds, handles, or parts thereof, of pocket and other cutlery, or any description of tools, and generally for the same purposes in the arts or sciences for which the material called mother-of-pearl, tortoise or turtle shell, the shells of marine animals, ivory, wood, or metals are used.

What I claim as my invention, and desire to secure by Letters Patent, is—

The manufacture of the articles above named, and the use, in whole or in part, for such manufacture of the interior or nacreous portion of the shells of the fresh-water molluscous animals of the United States and North and South America, substantially in the manner above described, or in any other substantially the same which will produce the intended result or effect.

LUCIUS E. CHITTENDEN.

Witnesses:
   J. M. HOOD,
   T. B. BUNTING.